No. 712,967. Patented Nov. 4, 1902.
G. B. ROGERS.
STANCHION.
(Application filed Apr. 23, 1902.)
(No Model.)
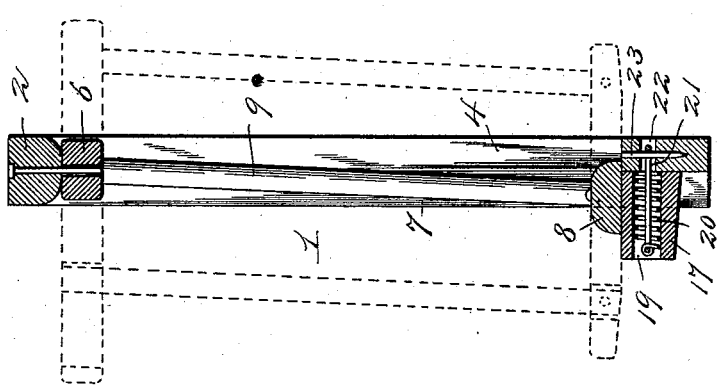
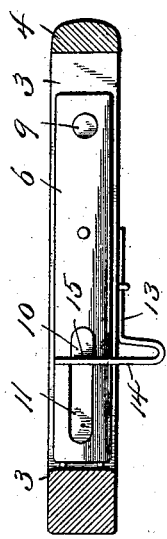
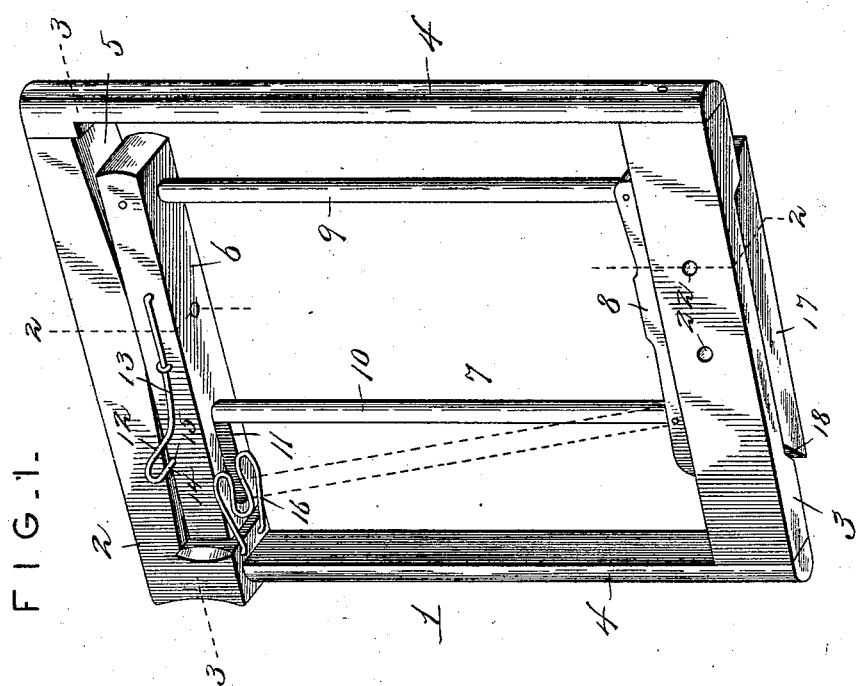
Inventor
George B. Rogers.
Witnesses
Harry L. Amer.
Chas. S. Hyer.
By Victor J. Evans
Attorney

UNITED STATES PATENT OFFICE.

GEORGE B. ROGERS, OF SARDINIA, NEW YORK.

STANCHION.

SPECIFICATION forming part of Letters Patent No. 712,967, dated November 4, 1902.

Application filed April 23, 1902. Serial No. 104,349. (No model.)

*To all whom it may concern:*

Be it known that I, GEORGE B. ROGERS, a citizen of the United States, residing at Sardinia, in the county of Erie and State of New York, have invented new and useful Improvements in Stanchions, of which the following is a specification.

This invention relates to stanchions; and the primary object of the same is to provide a simple and effective device of this character which will permit the animal to have ease and comfort and whereby a ready securement and quick release can be accomplished, the improved device particularly embodying a yielding attachment to compensate for the forward movement of the animal when rising from a reclining position.

The invention consists in the construction and arrangement of the several parts, which will be more fully hereinafter described and claimed.

In the drawings, Figure 1 is a perspective view of a stanchion embodying the features of the invention and showing the locking-bar open in dotted lines. Fig. 2 is a transverse vertical section on the line 2 2 of Fig. 1, showing the pivotal member of the stanchions swung around in dotted lines. Fig. 3 is a horizontal section taken in the plane of the line 3 3 of Fig. 1.

Similar numerals of reference are employed to indicate corresponding parts in the several views.

The improved stanchion comprises a supporting-frame 1, which may be the front of a stall, and comprises a head-bar 2 and a foot-bar 3, connected at opposite extremities by side bars 4. The lower portion of the head-bar 2 is formed tapering on its lower side toward the ends to give free clearance for the cap-bar 6 of a movable holding-frame 7, also comprising a lower supporting-bar 8 and vertically-disposed rods 9 and 10, the rod 9 being rigidly connected to the bars 6 and 8 and the rod 10 pivoted at its lower end to the bar 8 and having its upper end movable in a slot 11, extending through the extremity of the cap-bar 6 opposite that to which the upper end of the rod 9 is secured. The cap-bar 6 and supporting-bar 8 are pivotally connected to the head-bar 2 and foot-bar 3, so that when the head of the animal is held between the bars 9 and 10 lateral movement will be permitted and obviate the disadvantages incident to stanchion structures held in rigid position and often tending to cramp and otherwise injure the animal. A spring-lock 12 is carried by the cap-bar 6 and comprises a shank 13, secured to one side of said bar, and an arm 14 at an angle to said shank, which extends transversely through the top portion of said bar and rests normally in a recess 15. The arm 14 is long enough to project from one side of the cap-bar to the other, and the purpose of the spring-lock is to retain the movable rod 10 in parallel relation to the stationary rod 9 when it is desired to hold the head of the animal secured in connection with the stanchion. The rods 9 and 10 are curved, so as to avoid injury to the neck of the animal; but the upper outer portion of the rod 10, as clearly shown by Fig. 3, is flattened, as at 15, to provide a square bearing-surface for contact with the arm 14 of the spring-lock. When the animal is released from the pivoted frame 7, it is desired that the latter be prevented from swinging and projecting outwardly from the front of the stall with obvious disadvantages, and for this purpose the under side of the head-bar 2 has a resilient keeper 16 secured thereto and projecting inwardly under the lower side of one end of the cap-bar 6, the said keeper being so shaped that the upper end of the rod may be thrown thereinto, as indicated by dotted lines in Fig. 1, after the arm 14 has been released to permit said rod to move outwardly.

The improved device also embodies means for permitting a yielding movement of the lower part of the structure, which will advantageously come into play when the animal rises from a reclining position. This means is included by and forms a part of the foot-bar 3 and has the supporting-bar 8 directly pivoted thereto and consists of an outwardly-projecting compensating bar 17, which is normally seated in a slot 18 in the outer face of the said foot-bar. The compensating bar 17 is formed with openings 19, which are spaced apart and in horizontal alinement. Coiled springs 20 are loosely mounted in the said openings 19, and connected to the outer terminals thereof are links 21, which extend inwardly into openings 22, formed in the foot-bar, and loosely engage pins 23, driven downwardly through the said openings. The operation of this attachment, which forms part of the foot-bar, is as follows: When the animal rises from a reclining position, a forward pressure is exerted on the lower portion of the stanchion or pivoted frame, and in view of the yielding attachment of the compensating bar 17 the animal is assisted in rising to her feet and strain and injury to the parts of the stanchion as an entirety is prevented.

The improved stanchion will be found exceptionally convenient in its operation, and though the preferred form of the same has been described it will be understood that changes in the proportions, dimensions, and minor details may be resorted to without departing from the spirit of the invention.

Having thus fully described the invention, what is claimed as new is—

A stanchion comprising a main frame having a compensating bar yieldingly held in connection with the lower portion thereof, and a pivoted frame having the lower portion thereof movably attached to said compensating bar and the other part connected to the top portion of the main frame, the said pivoted frame comprising a stationary rod and a movable rod.

In testimony whereof I affix my signature in presence of two witnesses.

GEORGE B. ROGERS.

Witnesses:
JOHN W. GOLDBERG,
M. A. WOOD.